(12) United States Patent
Christie et al.

(10) Patent No.: US 7,003,402 B2
(45) Date of Patent: Feb. 21, 2006

(54) METHOD OF PROCESSING DATA

(75) Inventors: Philip Christie, Fen Drayton (GB); Anthony D. Curtis, Lamberhurst (GB)

(73) Assignee: WesternGeco, L.L.C., Houston, TX (US)

( * ) Notice: Subject to any disclaimer, the term of this patent is extended or adjusted under 35 U.S.C. 154(b) by 188 days.

(21) Appl. No.: 10/479,098

(22) PCT Filed: Jun. 17, 2002

(86) PCT No.: PCT/GB02/02774

§ 371 (c)(1),
(2), (4) Date: Nov. 24, 2003

(87) PCT Pub. No.: WO02/103397

PCT Pub. Date: Dec. 27, 2002

(65) Prior Publication Data

US 2004/0215396 A1    Oct. 28, 2004

(30) Foreign Application Priority Data

Jun. 16, 2001 (GB) ................................. 0114744

(51) Int. Cl.
*G01V 1/28* (2006.01)

(52) U.S. Cl. .......................................... 702/14; 703/5

(58) Field of Classification Search ................ 702/14, 702/17, 13, 12; 367/62, 15; 181/112; 703/5, 703/10
See application file for complete search history.

(56) References Cited

U.S. PATENT DOCUMENTS

| 4,041,443 | A | | 8/1977 | Thigpen | 340/15.5 AF |
| 4,633,400 | A | | 12/1986 | Chittineni | 364/421 |
| 5,963,507 | A | * | 10/1999 | Barr et al. | 367/15 |
| 5,971,095 | A | * | 10/1999 | Ozbek | 181/112 |
| 5,991,238 | A | * | 11/1999 | Barr | 367/62 |
| 6,446,008 | B1 | * | 9/2002 | Ozbek | 702/17 |

OTHER PUBLICATIONS

International Search Report dated Oct. 4, 2002 (PCT/GB02/02774).

J. Martin et al., "Acquisition of Marine Point Receiver Seismic Data with a Towed Streamer, Expanded Abstract ACQ3.3", 60$^{TH}$ Annual International Meeting of the Society of Exploration Geophysicists, 2000 XP002214305.

(Continued)

*Primary Examiner*—Carol S. W. Tsai
*Assistant Examiner*—Victor J Taylor
(74) *Attorney, Agent, or Firm*—WesternGeco L.L.C.

(57) ABSTRACT

A method of processing data sequences obtained at substantially the same time at locations spatially separated from one another is disclosed. A sequence indicative of a measure of spread of the data sequences or of selected data sequences is determined. A common signal data sequence may also be determined from the (selected) data sequences. The measure of spread of the data sequences is preferably normalized, for example relative to the absolute value of the common signal data sequence. The measure of spread is a measure of the noise to signal ratio in the initially-obtained data sequences. It may be used to control the parameters of other processing steps performed on the data sequences. Alternatively or additionally, the measure of spread may be output, for example for monitoring by an observer. The method can be applied to the processing of seismic data obtained using a single sensor seismic data acquisition system.

31 Claims, 4 Drawing Sheets

OTHER PUBLICATIONS

G. Baetan et al., "Acquisition and Processing of Point Receiver Measurements in Land Seismic, Expanded Abstract ACQ3.4", 60TH Annual International Meeting of the Society of Exploration Geophysicists, 2000, XP002214306.

G. Baetan et al., "Acquisition and Processing of Point Source Measurements in Land Seismic, Expanded Abstract ACQ3.5", 60TH Annual International Meeting of the Society of Exploration Geophysicists, 2000, XP002214307.

* cited by examiner

METHOD OF PROCESSING DATA

BACKGROUND OF THE INVENTION

This is a nationalization under 35 U.S.C. § 371 of International Application PCT/GB02/02774, filed under the Patent Cooperation Treaty on Jun. 17, 2002, claiming priority to Application Serial No. 0114744.6, filed in Great Britain on Jun. 16, 2001. Accordingly, we claim priority under 35 U.S.C. § 119 to Application Serial No. 0114744.6, filed in Great Britain on Jun. 16, 2001.

1. Field of the Invention

The present invention relates to a method of processing data, in particular to the processing of seismic data acquired using single sensor seismic acquisition.

2. Description of the Related Art

A conventional method of seismic data acquisition is illustrated schematically in FIG. 1. In this conventional method, seismic data are acquired by an array 1 containing a plurality of sensors 2, 2'. The sensors 2, 2' in FIG. 1 are arranged in a linear array, but they could alternatively be arranged in, for example, a two-dimensional array. In the linear array 1 of sensors shown in FIG. 1, each sensor is separated from adjacent sensors by a substantially constant distance. The distance d between the centre of one sensor and the centre of an adjacent sensor is approximately 3.125 m in this example, although conventional embodiments of seismic acquisition systems have widely varying sensor separations.

A typical array of seismic sensors contains a large number of sensors. It is conventional practice for the sensors in an array to be "hard-wired" into groups of near-by sensors, where each sensor in a group receives substantially the same signal component from the sub-surface target to be imaged. Grouping is intended to improve the signal-to-noise ratio by electrically merging the analogue signals from each sensor into a single signal. This single signal represents an estimate of the signal which is common to all the sensors in the group, and is generally known as a "common signal".

The group length (that is, the length of a group of sensors) is chosen such that the coherent noise to be suppressed by the analogue merging has spatial wavelengths which lie between twice the sensor spacing and the group length. Random noise is assumed to be uncorrelated from sensor to sensor and thereby attenuated by the merging process. The group length and sensor spacings are largely fixed for the duration of a survey. The hard-wiring of sensors into groups is done before the grouped output signal is digitised for transmission to the recording system.

In the example shown in FIG. 1, the sensors are hard-wired into groups, with each group containing nine adjacent sensors. The extent of each group is therefore approximately 25 m. In the array of FIG. 1, adjacent groups "overlap" with one-another, as the sensor 2' is both the right-handmost sensor of the $j^{th}$ group and the left-handmost sensor of the $k^{th}$ group. Other amounts of overlap may be used in different acquisitions, with a goal of ensuring that the seismic wavefield reflected from the sub-surface target is adequately sampled in space to capture the spatial variations of the target to be imaged and to ensure that there is no leakage of spatially-aliased energy. This commonly results in the group length being twice the group interval (50% overlap), but the overlap principle is sufficiently illustrated by the simple one sensor overlap in FIG. 1.

The outputs of the individual sensors in each group are merged in a pre-determined manner, and the merged output of each group is used for further signal processing. Thus, the output of the seismic data acquisition arrangement of FIG. 1 consists of a series of merged outputs, one merged output for each group. FIG. 1 shows the merged output from the $j^{th}$ group, as $\overline{S}^j$, and the merged output from the $k^{th}$ group, as $\overline{S}^k$. The conventional process of merging the individual outputs of the sensors in each group is generally an ensemble averaging process, that yields a weighted average of the individual sensor outputs representing the estimate of the signal common to all the sensors in the group.

Single sensor seismic (SSS) is a new concept in the acquisition of seismic data and is embodied in Schlumberger's Q system which is described by J Martin et al in "Acquisition of marine point receiver seismic data with a towed streamer", Expanded Abstract ACQ 3.3, 60th Annual International Meeting of the Society of Exploration Geophysicists, Calgary (2000), by G. Baeten et al in "Acquisition and processing of point receiver measurements in land seismic", Expanded Abstract ACQ 3.4, 60th Annual International Meeting of the Society of Exploration Geophysicists, Calgary (2000) and by G. Baeten et al in "Acquisition and processing of point source measurements in land seismic", Expanded Abstract ACQ 3.5, 60th Annual International Meeting of the Society of Exploration Geophysicists, Calgary (2000). SSS data acquisition is distinguished from the conventional seismic data acquisition in that the individual output of each sensor is available for signal processing operations. In SSS data acquisition, the seismic wave field is sampled by sensors, each of which produces an individual digital output signal. The digital output signal for each sensor is available for further signal processing operations. SSS data acquisition can be used with seismic sensors disposed on land, at or near the sea surface, within the water column, within a bore hole, on the sea bed, or buried into the sea bed. The sensors may be single or multiple component sensors sampling pressure, displacement, velocity, acceleration or pressure gradient, or combinations thereof.

SUMMARY OF THE INVENTION

The present invention provides a method of processing data comprising the steps of: determining, from a first data sequence acquired by sampling a signal having associated uncertainty at a first sensor and from a second data sequence acquired by sampling substantially the same signal having associated uncertainty at a second sensor spatially separated from the first sensor, a sequence indicative of a measure of spread of the first and second data sequences, thereby to provide an estimate of the initial uncertainty in the signal.

It has been proposed to use measurements taken at adjacent sensors to estimate spatial derivatives of a wavefront. A spatial derivative estimated in this way will incorporate the spatial separation of the sensors, whereas a measure of spread of the present invention will either retain the original dimension of the seismic signals (eg if the standard deviation is used as the measure of spread), have the square of the original dimension of the seismic signals (eg if the variance is used as the measure of spread), or be dimensionless (for a normalised measure of spread).

A conventional data acquisition method of the general type shown in FIG. 1 provides only an estimate of the common signal recorded at the sensors within a group, in FIG. 1 illustrated by the average of the signal recorded at the sensors. The present invention, in contrast, is able to provide a measure of spread of the signals recorded at sensors within a group. The invention can provide a measure of spread of the signal either before or after processing the signal to remove noise. This measure of spread can be used (i) to guide and estimate the performance of the noise attenuation process, and/or (ii) as an indicator of the uncertainty in the seismic signal, in particular as an indicator of the noise content of the seismic signal. This can be carried forward into subsequent processing steps to produce seismic products, such as an image of the subsurface, attributes of the seismic image or estimates of earth parameters based upon inverted amplitudes of the seismic data, and estimates of the confidence in those seismic products. Knowledge of the initial uncertainty in the signal as sampled at the sensors allows the processing steps to be controlled so that the processed data has a reduced uncertainty.

The first and second sensors are required to be close enough together so that the seismic wavefront at the first sensor is substantially equal to the wavefront at the second sensor (typically, the two sensors can be up to at least 25 m apart). Provided that this is the case, the first and second sensors will be close enough together for them to sample substantially the same seismic signal, and differences between data acquired at the two sensors will be attributable primarily to local noise. The measure of spread thus provides an estimate of the noise in the signal acquired at the sensors. It may be of use to compare the measure of spread against an absolute threshold. For example the noise level at receivers in a seismic surveying arrangement may be measured in the absence of a seismic source, to determine whether data acquisition can proceed.

In many applications, however, it is useful to consider the signal-to-noise ratio rather than the absolute noise level. In a preferred embodiment, therefore, the method further comprises the step of determining a data sequence indicative of the common signal within the first and second data sequences. This enables the signal-to-noise ratio to be determined.

As noted above, provided that the first and second sensors are close enough together for them to sample substantially the same seismic signal, differences between data acquired at the two sensors are attributable primarily to local noise. Grouping the sensors attenuates both random noise and coherent noise with a spatial wavelength that is between twice the sensor spacing and the group length. This coherent noise includes slow waves that propagate within the streamer, seismic energy travelling through the water directly from source to receiver and wave-induced noise. Since grouping the sensors attenuates noise in this way, the common signal sequence will have a greater signal-to-noise ratio than each individual data sequence.

A further advantage of the invention is that, again in contrast to the conventional acquisition system of FIG. 1, the present invention allows the estimate of the spread within a group (and also the estimate of the common signal, if this is determined) to be made at any time in the processing sequence while still retaining full access to the digital, single-sensor traces. In conventional group-forming, the process of estimating the common signal by merging analogue signals irretrievably removes access to the individual signals.

Although generating a measure of the spread of a signal is known, it has not hitherto been possible to apply this to seismic data. As noted above, the conventional process of hard-wiring sensors into groups removes access to individual signals. Moreover, until the advent of the Schlumberger Q system, seismic acquisition systems did not have the acquisition bandwidth to make it possible.

The reason for having arrays of data has been to attenuate unwanted noise, both coherent and incoherent. Attenuating the noise requires sampling at shorter intervals than necessary simply to sample the signal. The present invention makes use of the need to over-sample the signal, together with the access to individual signals provided by SSS acquisition systems, as a means of computing a measure of confidence in that signal.

The step of determining the common signal data sequence may comprise determining, for each value in the first data sequence, a value indicative of the commonality of a value in the first data sequence and a corresponding value in the second data sequence. Any suitable measure of the commonality may be used, such as, for example, the arithmetic mean of a value in the first data sequence and the corresponding value in the second data sequence.

In a preferred embodiment, the sequence indicative of the measure of spread is normalised by the absolute value of the common signal data sequence. Appropriate precautions are preferably taken to avoid division by zero should the instantaneous absolute value of the common data sequence be zero.

The sequence of measure of spread may be, for example, a sequence of the standard deviation of a value in the first data sequence and the corresponding value in the second data sequence. Alternatively, other measures of spread may be used.

The present invention also provides an apparatus for processing data. The apparatus may contain a programmable data processor.

The invention further provides a storage medium containing a program for the data processor of an apparatus as defined above.

Other preferred features of the invention are set out in the dependent claims.

BRIEF DESCRIPTION OF THE DRAWINGS

Preferred embodiments of the invention will now be described by way of illustrative example with reference to the accompanying figures in which.

DETAILED DESCRIPTION OF THE INVENTION

Figure 1:
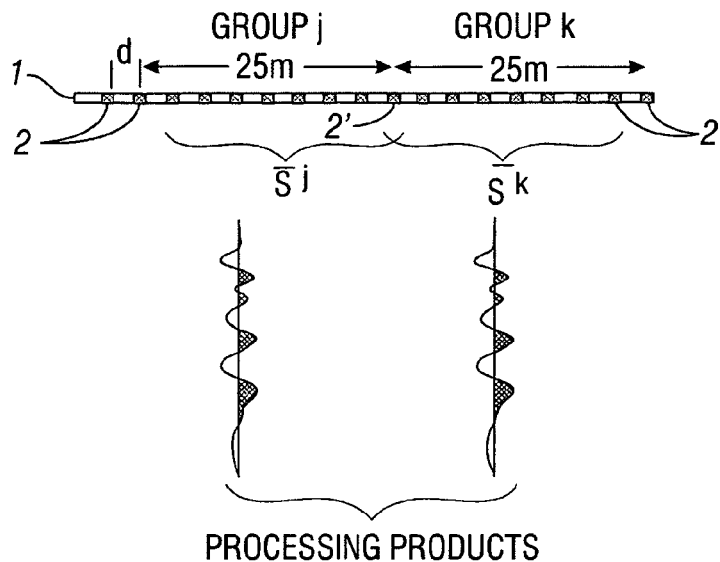
FIG. 1 is a schematic illustration of a conventional seismic data acquisition method.

The principles of the invention may conveniently be understood with reference to a simple seismic data acquisition set-up consisting of two sensors. In this example it will be assumed for convenience of explanation that each sensor measures a single seismic parameter S of a seismic signal, and produces an output that is a sequence of values of the parameter S. Thus, the first sensor samples the seismic signal and outputs the following sequence: $S_1(t_0)$, $S_1(t_0+\delta t)$, $S_1(t_0+2\delta t)$ . . . , and the second sensor samples the seismic signal outputs the following sequence: $S_2(t_0)$, $S_2(t_0+\delta t)$, $S_2(t_0+2\delta t)$ . . . It should be noted, however, that the invention can also be applied to multi-component sensors as will be discussed below.

In these sequences, $t_0$ is the time of the first sampling operation and $\delta t$ is the interval between successive sampling operations. In this example it is assumed, again for convenience of description, that the signal is sampled simultaneously at the first and second sensors, but the invention does not require that the first and second sensors are sampled simultaneously. As discussed below, provided the traces are sampled correctly (for example, that the digitised traces are unaliased), and that each trace is provided with a common reference time (for example a GPS time), then it will be possible to pre-process traces to compensate for a known delay between the traces. Thus, it is possible to apply the method of the invention even if the sampling operations at the first sensor are not simultaneous with the respective sampling operations at the second sensor, provided only that the seismic events of interest for analysis have been captured within the overall recording windows of both traces.

According to the invention, a sequence indicative of the spread between the signal acquired at the first sensor and the signal acquired at the second sensor is estimated. This sequence will be of the form: $\Theta(t_0), \Theta(t_0+\delta t), \Theta(t_0+2\delta t) \ldots$, where $\Theta(t)$ is a measure of the spread between the signal acquired at the first sensor at time t and the signal acquired at the second sensor at time t. For example, $\Theta(t)$ may be the standard deviation of $S_1(t)$ and $S_2(t)$, although other measures may be used.

In a preferred embodiment of the invention, a sequence indicative of the common signal between the signal acquired at the first sensor and the signal acquired at the second sensor is also estimated. This sequence will be of the form: $C(t_0), C(t_0+\delta t), C(t_0+2\delta t) \ldots$, where $C(t)$ is a measure of the common signal between the signal acquired at the first sensor at time t and the signal acquired at the second sensor at time t. For example, $C(t)$ may be the arithmetic mean of $S_1(t)$ and $S_2(t)$, although other measures may be used.

Provided that the first and second sensors are close enough together for them to sample substantially the same seismic signal, differences between data $S_1$ acquired at the first sensor and data $S_2$ acquired at the second sensors are attributable primarily to local noise. The differences will be eliminated or reduced in the common signal sequence so that the common signal sequence C will have a greater signal-to-noise ratio than each individual data sequence.

The measure of spread may be normalised, for example to allow comparisons to be made between seismic data acquired in different surveys or to allow for the natural decay of signal amplitude with time following the generation of seismic energy by the source. The measure of spread may be normalised relative to the absolute value of the common signal data sequence, in which case the normalised measure of spread would be $\Theta(t)/|C(t)|$.

As noted above, a procedure to avoid division by zero at an individual sample is preferably used. Any suitable procedure may be employed for this. For example, the absolute value of the common signal may be averaged over a short time window, or a constant small number $\epsilon$ may be added to $C(t)$ so that denominator is always non-zero. The following description of the invention will assume, without loss of generality, that such a procedure has been used.

The prior art processing methods are unable to provide a measure of the spread of signals acquired by different sensors, because the process of hard-wiring sensor outputs into groups destroys access to the individual sensor outputs.

A practical seismic survey will of course contain more than two sensors. However, the principles of the invention as described above can be applied to the processing of data acquired by a seismic surveying arrangement having more than two sensors. For example, two or more data sequences, each acquired at a different sensor, may be selected, and sequences indicative of, firstly, the common signal within the selected data sequences and, secondly, the spread (and/or normalised spread) of the selected data sequences can be estimated.

The data sequences may be selected by gathering the data sequences output by individual sensors into two or more ensembles, and selecting one of the ensembles. The grouping of the sensor outputs is a notional grouping that is defined during the data processing, and the grouping can be changed if desired.

An embodiment of the invention will now be described in detail with reference to FIGS. 2 and 4.

Figure 2:
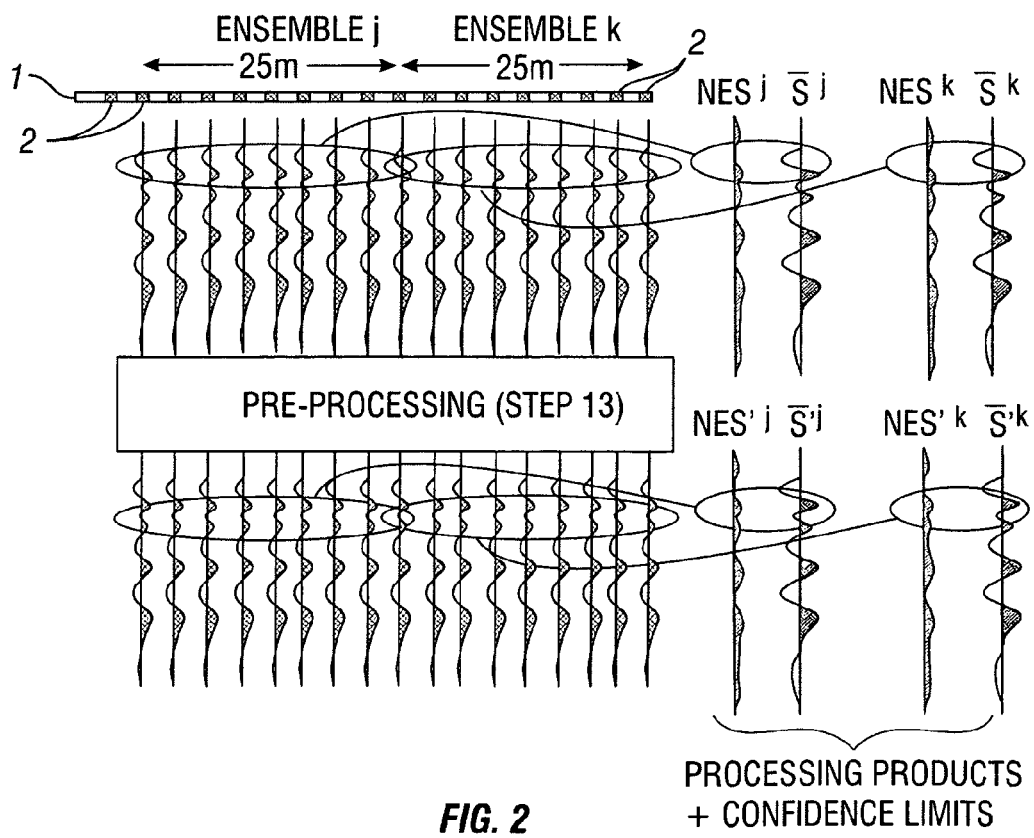
FIG. 2 is a schematic view of a Single Sensor Seismic data acquisition system suitable for use with a processing method according to an embodiment of the present invention.

FIG. 2 shows an array of seismic sensors suitable for use with both embodiments of the present invention. As with the prior art sensor array of FIG. 1, the array 1 of FIG. 2 comprises a plurality of seismic sensors 2. In FIG. 2 the seismic sensors 2 are shown as arranged in a linear array 1 with the separation between the centre of adjacent sensors in this embodiment being approximately 3.125 m, but the invention is not limited to use with a linear array of sensors nor to this particular spacing between sensors.

The sensors 2 in the array 1 of FIG. 2 are single sensor seismic (SSS) sensors. One example of a suitable sensor is that used in the Q-Marine acquisition system produced by Schlumberger, although this invention is not limited to marine seismic acquisition. In the sensor array of FIG. 2, the sensors 2 are not hard-wired into groups. Instead, the sensors are notionally divided into groups, or ensembles, for the purpose of processing the data acquired by the sensor array to enhance the seismic signal to noise ratio. That is to say, the allocation of sensors to ensembles may be defined, or re-defined, during data processing stages, rather than the sensors being hard-wired into groups as in the conventional acquisition system. The outputs from each individual sensor in an ensemble are pre-processed together. In FIG. 2, two ensembles of sensors in the array have been defined with each ensemble comprising nine adjacent sensors, but the invention is not limited to this particular grouping of the sensors.

Figure 4:
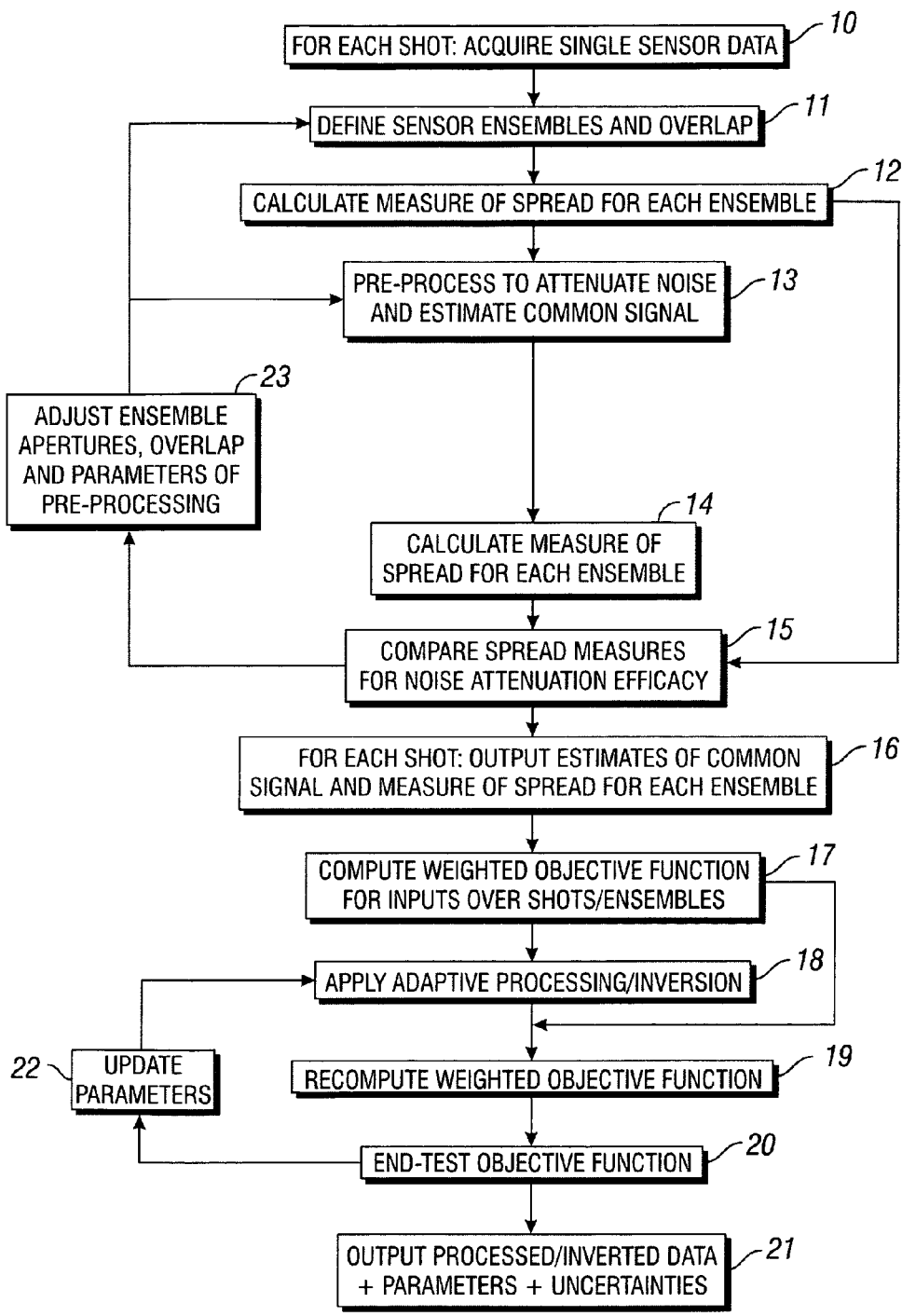
FIG. 4 is a flow diagram illustrating the data processing methods of the embodiments of FIGS. 2 and 3.

FIG. 4 is a flow chart illustrating the principal steps of a processing method according to the first embodiment of the present invention. In this embodiment both the measure of spread and the common signal are estimated.

At step 10 in FIG. 4, data are acquired by the sensors 2 of the sensor array 1 of FIG. 2. It will be assumed for ease of description that each sensor 2 measures a single physical parameter S, which could be, for example, the pressure or a component of the elastic wavefield such as displacement, velocity, acceleration, pressure gradient or any combination thereof. Each sensor 2 provides a digital output at a pre-determined sampling interval, $\delta t$,—that is, the output of the $m^{th}$ sensor is a data sequence having the following form:

$$S_m(t_{1m}), S_m(t_{1m}+\delta t), S_m(t_{1m}+2\delta t), \text{etc.} \quad (1)$$

or, formally, $$S_m = \{S_m(t_q)\}, t_{1m} \leq t_{qm} \leq t_{Nm} \quad (2)$$

In this sequence, $S_m$ is the sequence of values of the parameter S measured by the $m^{th}$ sensor, $t_{1m}$ is the time at which the first measurement $S_m(t_{1m})$ of the parameter S is made by the $m^{th}$ sensor, and $\delta t$ is the time interval between successive measurements. The arbitrary, discrete time $t_{qm}$ ranges from the time of the first sample, $t_{1m}$, to the time of the $N^{th}$ sample, $t_{Nm}$, in time steps $\delta t$. Similarly, the output of the $n^{th}$ sensor is the following data sequence:

$$S_n(t_{1n}), S_n(t_{1n}+\delta t), S_n(t_{1n}+2\delta t), \text{etc.} \qquad (3)$$

Formally, $$S_n = \{S_n(t_q)\}, \; t_{1n} \leq t_{qn} \leq t_{Nn} \qquad (4)$$

In this sequence, $S_n$ is the sequence of values of the parameter S measured by the $n^{th}$ sensor, and $t_{1n}$ is the time at which the first measurement $S_n(t_{1n})$ of the parameter S is made by the $n^{th}$ sensor. It is assumed that measurements made by the $n^{th}$ sensor are substantially simultaneous with the measurements made by the $m^{th}$ sensor. That is, it will be assumed, without loss of generality, that $t_{1m}=t_{1n}=t_1$, $t_{Nm}=t_{Nn}=t_N$, and $t_{qm}=t_{qn}=t_q$, for all sensors. (As noted above, a known time delay between traces can be compensated for by pre-processing the traces.)

It should be noted that the present invention may be applied to previously acquired SSS seismic data. In this case, step 10 is omitted and pre-existing seismic data are provided, for example by retrieval from storage.

At step 11 in FIG. 4, the notional grouping and overlap of the sensors' outputs are defined. That is to say, the outputs of the individual sensors are arranged into notional groups, or ensembles, as shown in FIG. 2, for processing purposes designed to increase the signal-to-noise ratio. The ensemble length is chosen to be short enough such that the seismic signal is substantially the same over the sensors in the ensemble, while the sensor spacing is selected so as to sample, without aliasing, the short wavelength coherent noise. Thus, the data processing is designed to enhance the common signal within the ensemble while minimising the random and short wavelength noise. Since the ensemble size and overlap are defined during the processing of the data, rather than by hard-wiring sensor outputs as in the prior art, it is therefore possible to re-define these dimensions during data processing, if this is necessary or desirable.

At this point, the data sequence acquired by each sensor may also undergo preliminary processing. For example, calibration corrections for sensor amplitude and phase may be applied to the data, together with static time-shifts for known positioning departures from the seismic reference datum, and other deterministic corrections.

At step 12, an initial measure of the spread of the amplitudes recorded by each sensor at each substantially simultaneous time sample within the ensemble is estimated. This measure may be standard deviation, variance, a simple difference between maximum and minimum amplitudes within the ensemble, or another statistical measure of spread.

Also at step 12, a measure of the commonality of the amplitudes recorded by each sensor at each substantially simultaneous time sample within the ensemble is estimated. This measure may be, for example, the arithmetic mean of the amplitudes recorded by each sensor at each substantially simultaneous time sample, although other measures can be used.

The measure of the spread is preferably normalised, for example normalised relative to an estimate of the absolute value of the common signal within the ensemble. For example, the measure of spread can be normalised relative to the absolute value of the mean if the mean is used as the estimate of the common signal within the ensemble, although other normalisation factors can be used. In this embodiment the measure of spread will be taken to be the standard deviation, and this will be normalised relative to the absolute value of the mean.

The sequence of average values from the sensors of the $j^{th}$ ensemble is given by $\overline{S}^j$, where $$\overline{S}^j = \langle S_i^j \rangle \qquad (5)$$

or, formally, $$\overline{S}^j = \{\overline{S}^j(t_q)\} = \left\{ \frac{1}{P} \sum_{i=1}^{P} S_i^j(t_q) \right\}, \; t_1 \leq t_q \leq t_N \qquad (6)$$

where the angle bracket in equation 5 denotes the expectation operator over the P sequences $S_i^j$ comprising the outputs from the P sensors from the $j^{th}$ ensemble. In equation 6 each sequences $S_i^j$ is given equal weighting in the determination of the mean, but a non-uniform weighting scheme may alternatively be employed in computing the mean. At an arbitrary time sample $t_q$, the ensemble of sensor values $\{S_i^j(t_q)\}, 1 \leq i \leq P$, in equation 6 is averaged and the ensemble averaging process is repeated for all values of $t_q$ in the range $t_1 \leq t_q \leq t_N$. For example, if the $j^{th}$ ensemble comprised only the two sequences $S_m$ and $S_n$, the first two terms of the ensemble average sequence would be:

$$\overline{S}^j(t_1) = [S_m(t_1) + S_n(t_1)]/2$$
$$\overline{S}^j(t_1 + \delta t) = [S_m(t_1 + \delta t) + S_n(t_1 + \delta t)]/2 \qquad (7)$$

This averaging process is repeated for the sensor outputs obtained at each successive discrete time sample, and in this way the data sequence $\overline{S}^j$, representing the average sensor output from the $j^{th}$ ensemble, is built up. The sequence $\overline{S}^j$ is used as the initial estimate of the signal common to the sensors of the $j^{th}$ ensemble. Similarly, the process is repeated, in parallel or sequentially, for all the ensembles making up the receiving sensor array. Note that this set of average sequences (with appropriate weighting) is equivalent to the data output from a conventional, analogue-grouped system, in which the sensors are hard-wired into the same sensor configuration.

Similarly, the sample standard deviation sequence of the $j^{th}$ ensemble, $\sigma^j$, is given by $$\sigma^j = \left\langle \left( S_i^j - \overline{S}^j \right)^2 \right\rangle^{1/2} \qquad (8)$$

or, formally, $$\sigma^j = \{\sigma^j(t_q)\} = \left\{ \sqrt{\frac{1}{P} \sum_{i=1}^{P} \left( S_i^j(t_q) - \overline{S}^j(t_q) \right)^2} \right\}, \; t_1 \leq t_q \leq t_N \qquad (9)$$

where, as with the computation of the mean, the sample standard deviation is computed for the output values of the sensors of the $j^{th}$ ensemble for each time sample $t_q$. The ability to compute these estimates is unique to SSS acquisition because of the ability to access the over-sampled wavefield prior to group-forming and to retain the individual traces after estimating the common signal within the ensemble (FIG. 2).

Without loss of generality, we may define a sequence comprising a normalised estimate of the spread in amplitudes, $NES^j$, where the sequence value $NES^j(t_q)$ at time sample $t_q$ is defined as the sequence of normalised values of the measure of spread. In this embodiment, $NES^j$ is the sequence of values of the ratio of the ensemble standard deviation to the corresponding absolute value of the ensemble mean. That is, $$NES^j = \frac{\sigma^j}{|\overline{S}^j|} = \left\{ \frac{\sigma^j(t_q)}{|\overline{S}^j(t_q)|} \right\}, t_1 \leq t_q \leq t_N \tag{10}$$

The sequence $NES^j$ may be thought of as a prior measure of the noise to signal ratio local to the $j^{th}$ ensemble, subject to the model assumptions that noise includes random and coherent noise with wavelengths shorter than the ensemble aperture. Local signal will then include long wavelength coherent noise, such as multiple reflections, which will be attenuated in later processing steps.

If desired, one or more of the sequences of the normalised measure of the spread, the measure of the spread, and the common signal can be output for display by an operator. Thus, in this embodiment one or more of the sequences of the normalised measure of the spread, $NES^j$, the mean, $\overline{S}^j$, and the standard deviation, $\sigma^j$, of the sensor outputs in each ensemble can be output as visual traces after determination at step 12. This can be done if, for example, it is desired for an operator to monitor the sequences as the data are acquired. Additionally or alternatively, one or more of the sequences can be stored for later use, for example at step 15 described below, using any convenient storage means such as, for example, magnetic tape, discs or computer memory.

Thus, the invention in its broadest form is represented by steps 11 and 12 of FIG. 4, allowing estimates of uncertainty of the raw seismic data at the pre-group stage. Applications of such uncertainty will now be discussed.

In a preferred embodiment of the invention, at step 13 of FIG. 4, preparations for a more refined estimate of the common signal for each ensemble are made by pre-processing the data to attenuate the random and short wavelength noise within the ensemble. Small, relative time-shifts may be applied to the data traces to compensate for non-simultaneous arrival of the signal and thereby beam-steer the ensemble towards the anticipated direction of the incoming seismic wavefront. These time-shifts may be based, for example, upon the offset of the ensemble centre from the source. Alternatively, they may be chosen so as to minimise the normalised spread estimate over a selected time window. Noise attenuation and common signal estimation may be performed by, but are not limited to, adaptive noise and interference attenuation techniques such as the techniques described in UK patent No 2 309 082, U.S. Pat. No. 5,971,095, or UK patent GB 2 337 591.

Next, at step 14 in FIG. 4, the sequences of the common signal and the measure of the spread and, if desired, the normalised measure of the spread, can be recalculated and can be output for display by an operator. Thus, in this embodiment one or more of the sequences comprising the measure of the spread, $\sigma^j$, or the normalised estimate of the spread, $NES^j$, is re-computed, by recomputing the sequences for the common signal and for the measure of the spread for each of the ensembles making up the sensor array. This is done using the same process described at step 12, except that the data sequences have had optional beam-steering and noise removal processes applied to them. The $j^{th}$ ensemble is considered as an example, although step 14 is repeated and carried out in parallel for all ensembles making up the sensor array. If the pre-processing carried out at step 13 was effective, the values of the re-computed sequences, $NES'^j(t_q)$, should be smaller than the corresponding values of the sequences $NES_j(t_q)$ prior to noise attenuation.

In step 15 of FIG. 4, the initial and revised normalised spread estimates $NES'^j(t_q)$, $NES_j(t_q)$, are compared. If $NES'^j(t_q) > NES^j(t_q)$, for a significant range of samples, then the processing step 13 would have increased the normalised spread within the $j^{th}$ ensemble. This condition can be used as a quality control warning, and the raw data or the parameters used within processing step 13 may be examined.

If $NES'^j(t_q) \approx NES^j(t_q)$ and $\sigma'^j \approx \sigma^j \neq 0$ (where $\sigma'^j$ is the recalculated standard deviation), for a significant range of samples, processing step 13 would have been relatively ineffective. In this event, step 11 may be repeated and the data may be re-ordered into ensembles with different dimensions or overlap. Additionally or alternatively, the data may be corrected for residual time-shifts, gains or phase shifts at step 23. Additionally or alternatively, the parameters of processing step 13 may also be altered, and the data reprocessed. Depending upon the parameters being adjusted, it is possible that this feedback loop may be automated so as to optimise the parameter values by minimising the normalised estimate of the spread.

If $NES'^j(t_q) < NES^j(t_q)$ and $\sigma'^j(t_q) \neq 0$, for a significant range of samples, this shows that the pre-processing at step 13 has reduced the spread of the data within an ensemble. The noise to signal ratio improvement quantifies the benefit of the adaptive noise or interference attenuation, or other processing algorithm, used in step 13, over conventional grouping for the same sensor configuration. Experience will determine the level of improvement expected, but an improvement of 10–30 dB, or better, is expected in the case of certain noise types such as swell noise in marine seismic.

If desired, one or more of the sequences of the re-calculated measure of the spread, the normalised measure of the spread, and the common signal can be output for display by an operator. Thus, in this embodiment one or more of the sequences of the re-calculated normalised measure of the spread, $NES'^j$, the mean, $\overline{S}'^j$, and the standard deviation, $\sigma'^j$, of the sensor outputs in each ensemble are output at step 16. This can be done if, for example, it is desired for an operator to monitor the mean output and/or the measure of spread as the data are processed through step 13 in FIG. 4. Alternatively, only the data corresponding to certain conditions of the changes in $NES^j$ need be displayed for operator intervention.

In FIG. 2 the mean outputs of the sensors in the $j^{th}$ and $k^{th}$ ensembles, and the corresponding normalised estimates of spread of the sensor outputs of the $j^{th}$ and $k^{th}$ ensembles are shown as being output in the form of traces, for convenience of explanation. It should be understood that it is not necessary for them to be output as visual traces. Whether or not they are output as visual traces, the sequences will be output in other, electronic forms or stored in memory, for use in further processing steps, as described below.

For many processing applications, it is likely that storage of the single sensor traces is unnecessary beyond the noise attenuation steps within the ensembles as described above, and so the set of sequences $\overline{S}'^j$, one sequence for each ensemble in the sensor spread, are considered to represent fully the spatially sampled wavefield recorded by the sensor array for that particular shot in the seismic survey. This reduces the number of traces required to be stored for further processing. The difference from conventionally acquired data is that not only has there been optimal, quantifiable attenuation of the short wavelength and random noise within the ensemble, but each time sample within each ensemble sequence $\bar{S}^{ij}$ is characterised by the corresponding time sample of the normalised spread estimate $NES^{ij}$. The values in the sequences $NES^{ij}$ represent prior estimates of the uncertainty within the data. These values can go forward for further combination with traces from other ensembles in the sensor spread and/or other shots within the seismic survey, where the manner of the combination takes due regard of the prior uncertainties, making use of known techniques of data combination and uncertainty tracking. The benefits of having access to prior estimates of uncertainty are that the manner of combining traces can be optimised to minimise the overall effect of the uncertainty and that the final products of the seismic data processing may be characterised by more accurate estimates of uncertainty.

A general data processing flow is illustrated in steps 17 to 22 in FIG. 4, and this illustrates how the measure of spread provided by the present invention may be used in subsequent processing of the acquired data. At step 17, a set of traces $\bar{S}^{ij}$ over various ensembles and shots, appropriate for the processing step involved, are input from step 16 or another processing step, together with the corresponding set of spread estimates $NES^{ij}$. In adaptive processing, or data inversion, a model is formulated and it is desired to fit the model to the data in an optimal manner by estimating the processing or inversion parameters which result in modelled traces having a minimal difference, according to some metric, from the measured traces $\bar{S}^{ij}$. The difference is often estimated in an objective function which is desired to be minimised as a way of defining the optimal processing or inversion parameters. To avoid over-fitting the model to the noise in the data, and to understand the relative reliability of the various data, it is desirable to have prior estimates of the data uncertainty. Often these are guessed or, alternatively, simply omitted, treating all data as of equal reliability. Single sensor acquisition and the measure of spread provided by the present invention allow each data value to have an associated uncertainty given by the normalised estimate of the spread. These estimates are used in computing the objective function by weighting the input data in a manner which places the greatest reliance upon those data with the smallest values of normalised spread. An iteration of the adaptive processing or inversion scheme is applied in step 18 and the resulting weighted objective function is recomputed in step 19. In step 20, the change in the objective function is evaluated for fulfilment of an end-test criterion. If the criterion is not satisfied, the parameters of the processing or inversion model are updated—usually by computing a set of sensitivities of changes in the data to changes in the parameters—in step 22 and the loop is re-entered at step 18. The end-test criterion may be satisfied either by no further improvement in the objective function, or by a fit of the model data to within the prior uncertainties in the recorded data, or a combination of both. At this point, step 21 in FIG. 4, the processed or inverted data are output, together with the parameters of the processing or inversion model, and the final uncertainties in the data and the parameters.

For other processing applications, such as certain non-linear or data-adaptive processes, it may be desirable to retain the single sensor data traces, where the ensembles are defined as at the end of step 16 in FIG. 4, together with their associated estimates of common signal and normalised spread in the sequences $\bar{S}^{ij}$ and $NES^{ij}$. The data can then be processed in a manner analogous to that displayed in FIG. 2 and steps 12 to 15 in FIG. 4 except that the output estimates from step 16 become input estimates to the new processing step. The change in $NES^{ij}$ to $NES''^{j}$ following the new data processing step (FIG. 3) can then be used to optimise the data processing and deliver a new estimate of prior uncertainty to further processing steps or final products. Because the single sensor traces are retained, it is possible in principle to "group" the data at any convenient point in the processing sequence by taking the estimate of the common signal to represent the optimised signal within each group and, by doing so, reducing computational and storage requirements.

For linear, deterministic data processing operations, the set of sequences $NES^{ij}$ characterising the uncertainty in the estimated signal traces $\bar{S}^{ij}$ are sufficient to determine the uncertainty at the end of the processing operation. This includes operations involving the compositing of multiple traces together, such as summations or stacking, where the uncertainty can be incorporated through appropriate weighting of the time samples going into the stack by the normalised estimate of the spread, or a derivative thereof such as variance.

In the embodiments described above, the ratio of the standard deviation to the absolute value of the mean is used as a measure of the spread of the outputs of each individual sensor within a group around the mean sensor output for that group. The invention is not, however, limited to the use of this metric as the measure of the spread, and any other convenient measure may be used. For example, in many applications it may be preferable to use the variance (which is the square of the standard deviation) as the measure of spread, because of the ease of use of the variance in multi-trace combinations. For linear processing operations, including those involving multiple traces, it is relatively straightforward to carry the variance through the processing steps.

In addition to the normalised standard deviation and variance, it is in principle possible to use other statistical measures to measure the spread of the outputs of the sensors in an ensemble such as, for example, the average of the absolute difference between each sensor output and the mean, or the magnitude of the difference between the highest and lowest sensor outputs. Because seismic traces are not time-stationary sequences, it is desirable to normalise the measure of spread and in this embodiment we have chosen to use the absolute value of the instantaneous ensemble mean, but this invention is not limited to that choice of normalisation, nor that choice of estimate of the conmmon signal within the ensemble. It may also be appropriate to use metrics which are estimated over windowed sections of sequences, as opposed to instantaneous values.

It is possible to determine a measure of the spread of the sensor outputs in the present invention because the need to obtain adequate sampling of the noise field means that the sensor array will necessarily over-sample the seismic wavefield.

Seismic surveys are invariably affected by noise, such as environmental noise, or self-noise (which is where a seismic sensor detects unwanted acoustic noise generated by the seismic surveying arrangements). Noise that affects a seismic surveying system is usually coherent, and is also usually local to the acquisition system. The noise usually has an apparent wavelength at the sensors which is shorter than the apparent wavelength of the desired seismic signal generated by scattering within the earth's interior. Consequently, the individual sensors of a seismic sensor array are spaced so as to sample the noise wavefields sufficiently accurately to permit the noise wavefields to be attenuated without undue aliasing of the noise energy into the signal band. The purpose of hard-wiring sensors into groups in a conventional seismic array, and averaging the individual output signals of the sensors within a group, is to attenuate noise before the signal is processed. In the case of conventional systems, however, this pre-determined division of the sensors in the groups is not ideal for attenuation of noise, and often degrades the quality of the acquired seismic signal.

A SSS data acquisition system provides access to the data produced by each individual sensor, and this allows signal processing to be optimised to minimise perturbations, improve the quality of the acquired signal, and remove a greater proportion of local noise from the signal.

In the case of a SSS data acquisition system, the sensor spacing within a notional group is determined by the desire to attenuate environmental noise and self-noise, which usually both have a short wavelength or coherency length. Since the sensors are not hard-wired into groups, the number of sensors within each group can be defined during the data processing steps.

The group interval in a SSS data acquisition system is determined by the need to provide adequate spatial sampling of the seismic energy scattered within the earth's interior. (The group length should normally be twice the group interval, since the sampling theorem says the wavefield should be sampled at two or more points per wavelength.) The sensors within the group interval are therefore over-sampling the seismic field, and, according to the invention, this over-sampling of the seismic wavefield is used to determined a measure of the spread of the outputs of individual sensors within a group about the mean sensor output for that group.

One illustration of the over-sampling of the seismic wavefield is that of the Fresnel zone radius which defines the size of the seismic reflector that contributes to the amplitude of a primary reflection (a "primary" reflection is where a path of seismic energy from a seismic source to a seismic sensor contains only a single reflection). The Fresnel zone radius defines the size of the seismic reflector which contributes to the amplitude of a primary reflection. For most overburden models, this is over 100 m radius for a 50 Hz signal component at a two-way time of 1 s, compared to a group length of 25 m in FIG. 2.

A second illustration can be obtained by considering the case where seismic data are acquired using a source and a sensor array separated by a horizontal distance of 730 m, and where the seismic energy is reflected by a reflector at a depth of 1 km below the earth's surface. In this acquisition geometry, the change in emergence angle across a sensor ensemble having a length of 25 m is around 0.6°, at an emergence angle of 20°.

The change in path length across the ensemble of sensors is around 9 m. This results in an incremental delay in arrival time across the ensemble of some 6 ms for a marine survey, which may require beam-steering the sensor outputs for signal bandwidth preservation. Such beam-steering is compensating for the tilt, or the first derivative, of the wavefront across the ensemble. In the model used here it is assumed that the higher-order derivatives, such as the curvature, of the wavefield across the ensemble are small and that their neglect, by assuming them to be noise, does not adversely affect subsequent estimates of the common signal nor the measure of spread. As mentioned above such higher-order derivatives could be estimated and could in principle be used to refine the estimate of the common signal in this invention.

In the embodiments described herein, however, these higher-order derivatives are treated as noise for simplicity of explanation. However, amplitude versus offset (AVO) effects and geometrical spreading are insignificant for these changes in angle and path length. Therefore, an estimate of the variability of the sensor outputs about the mean sensor output for an ensemble of sensors, can be derived directly from the SSS sensor outputs.

Figure 3:
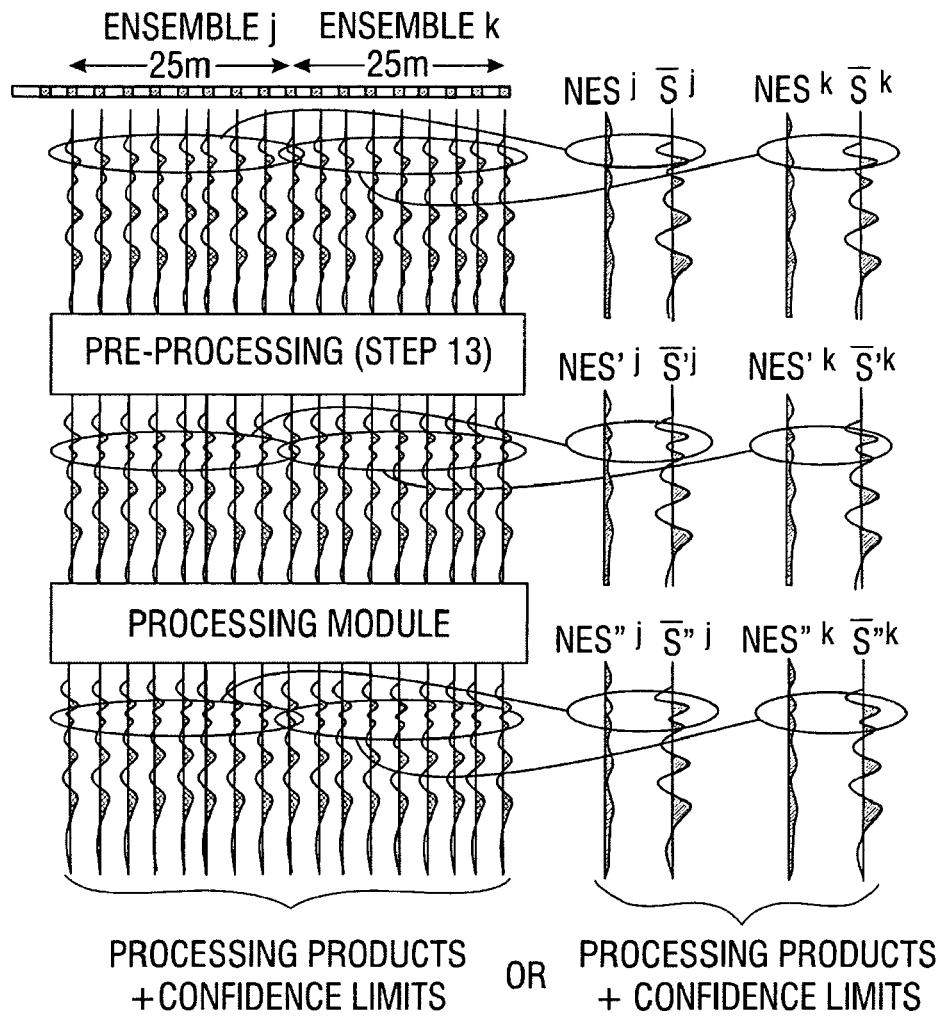
FIG. 3 is a schematic illustration of a data processing method according to another embodiment of the invention.

A second embodiment of the invention is illustrated in FIG. 3. This embodiment is particularly suitable where the seismic data are intended to be processed using non-linear processing operations.

Uncertainty tracking through data processing using non-linear operations is often not as straightforward as that using linear operations. In contrast to the embodiment of FIG. 2, therefore, the step of assigning the common signal estimates, $\bar{S}^{ij}$, to represent the output signals from each ensemble is omitted. In the embodiment of FIG. 3, all the data sequences produced by individual sensors are carried through a further processing module as ensembles. The ellipses in FIG. 3 indicate which data sequences are contained in the $j^{th}$ and $k^{th}$ ensembles. The sequences comprising estimates of common signal and data spread within each ensemble can be obtained at any desired stage in the data processing, either before or after the data have been processed by the non-linear processing module.

In a further embodiment of the present invention, the measure of the spread of the sensor outputs in a group is used to select parameters for pre-processing the data with the objective of reducing the noise to signal ratio within each ensemble. That is to say, the parameters of the pre-processing step(s) in blocks 11 and/or 13 of FIG. 4 are selected on the basis of the change in the normalised measure of spread calculated at steps 12 and 14. This is shown schematically in FIG. 4 by step 23—before the sensor outputs are notionally grouped. In this embodiment of the invention, therefore, the parameters of the pre-processing steps 11 and 13 are selected on the basis of the normalised estimate of the spread (or other measure of spread) of the data sequences output by the sensors. In this embodiment, a test sample of the data sequences output by the sensors is notionally grouped into ensembles at step 11, pre-processed at step 13, and the normalised measures of spread are calculated at steps 12 and 14. According to the level of improvement in spread seen at step 15, the parameters of the pre-processing steps 11 and 13 are then varied, either manually or automatically, and the normalised measures of spread are re-calculated; the step of varying the parameters of the pre-processing steps 11 and 13 is repeated until the normalised measure of spread, taken to represent the noise to signal ratio in the pre-processed signals, has been minimised. This embodiment is indicated schematically by step 23 in FIG. 4.

In a further embodiment of the invention, the sequences, $NES^{ij}$, of normalised measures of spread of the sensor outputs in an ensemble after pre-processing to minimise noise, are used to control the parameters of the subsequent adaptive processing/inversion steps carried out at steps 17, 18, 19, 20 and 22 of FIG. 4 on the sequences $\bar{S}^{ij}$ which represent the best estimates of the signal within each ensemble. For example, an appropriate measure of spread of the sensor outputs within an ensemble, normalised by an estimate of the common signal within each ensemble, would provide one estimate of signal-to-noise ratio within each ensemble after the pre-processing.

In a further embodiment of the invention, the appropriate normalised measure of spread of the sensor outputs is used to select the parameters of both the pre-processing steps 11 and 13, and the processing step 18 in FIG. 4.

In a further embodiment of the invention, the standard deviation or other normalised spread measure of the output signals is output as shown at step 15 and is monitored continuously during the acquisition process. If the standard deviation or other normalised spread measure indicates that the noise in the sensor outputs has exceeded a pre-set level, an operator would be alerted to take corrective action. In this embodiment, it is preferable that the standard deviation, or other normalised spread measure, is calculated in real time so that the operator will be alerted as soon as possible. Alternatively if it is desired to reduce the required processing power, the standard deviation, or other normalised spread measure, can be calculated for selected portions of the data produced by the sensors.

In the description of the above embodiments, it has been assumed that the sensors measure a single parameter. The present invention can, however, be applied to multi-component sensors by processing all, or some, of the output components of the sensors, or combinations thereof, as described above.

In the above description it has been assumed that the sensors 2 of the sensor array 1 produce a digital output. In principle, however, the invention could be carried out using sensors that produce an analogue output, by appropriately sampling the sensor outputs such that each sensor output can be stored on an appropriate medium for later use and re-use.

A method according to the present invention may be carried out using a suitably programmed data processor, such as one integrated with a Single Sensor Seismic acquisition system as developed by Schlumberger.

In the embodiments described above it has been assumed that each measurement made by one sensor is substantially simultaneous with the corresponding measurement made by another sensor, i.e. that $t_{qm}=t_{qn}$. In practice, there is no "start" to digitisation: all channels are sampled continuously and the resulting data streams are "chopped" according to the time that the seismic sources are actuated and the desired record length. In principle, the measurements made by one sensor need not be exactly simultaneous with measurements made by another sensor. However, if there is a progressive time delay between the same nominal sampling operation in successive channels this should be corrected for before further processing of the data.

Provided that the sampling rate is adequate for the bandwidth of the analogue signal—including the noise—being sampled (the maximum frequency in the analogue signal is limited by anti-alias filters to half the sampling frequency) then the resulting digital signals can be interpolated to a common sampling time, even if there are delays between the time of the first sample on trace 1 and the time of the first sample on trace 2. This is true provided that the delay between the time of the first sample on trace 1 and the time of the first sample on trace 2 is less then or equal to the sampling interval. Hence, if the samples on each trace are not acquired simultaneously, they are preferably interpolated to a common time reference before processing.

The invention has been described above with reference to processing SSS seismic data. However, the invention is not limited to processing seismic data. In principle, the invention could be applied to processing data acquired by any single sensor acquisition system that allows access to the individual sensor signals and where the need to attenuate local short wavelength noise leads to the sensing elements being formed into arrays and thus to oversampling of the signal. For example, the invention could also be applied to processing acoustic, ultrasonic or electromagnetic data as well as to seismic data.

Figure 5:
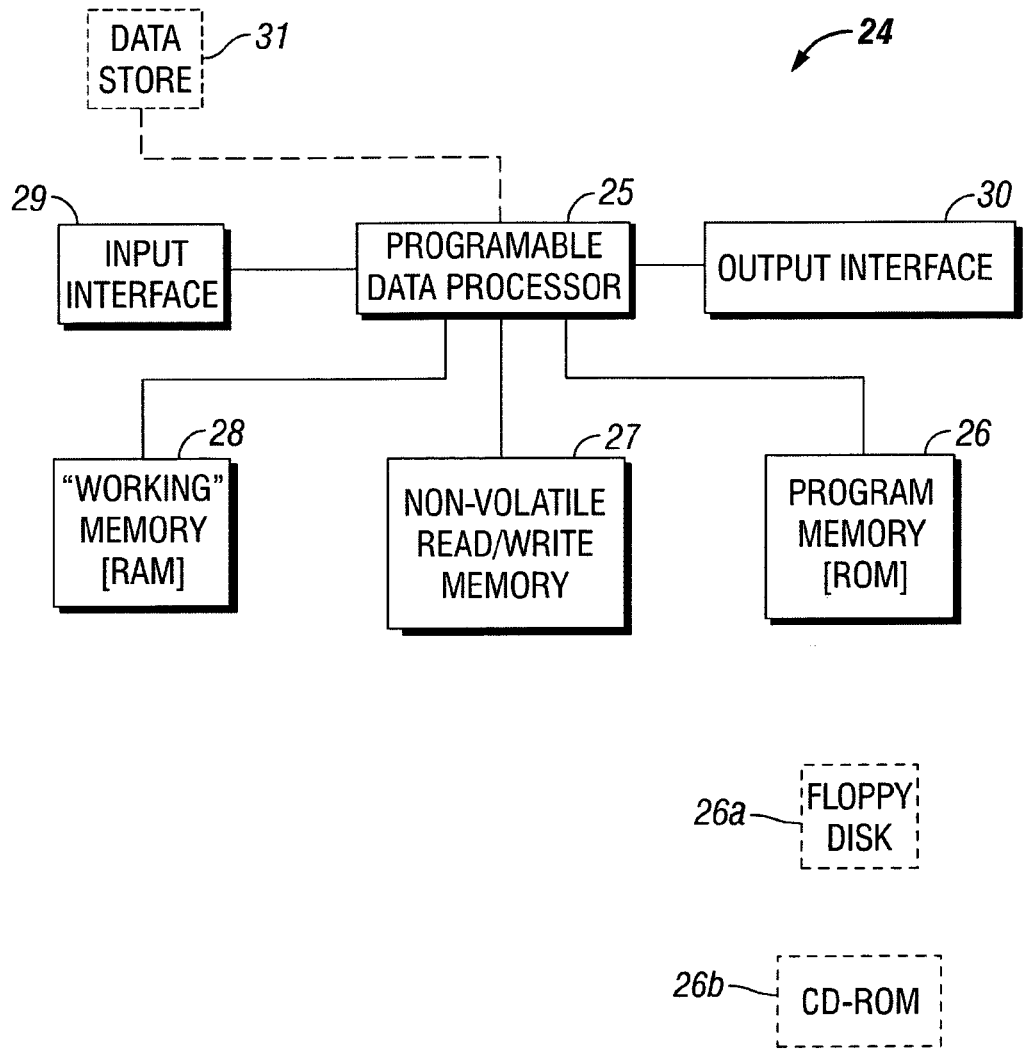
FIG. 5 is a block schematic diagram of an apparatus for processing data.

FIG. 5 is a schematic block diagram of an apparatus 24 that is able to perform a method according to the present invention.

The apparatus 24 comprises a programmable data processor 25 with a program memory 26, for instance in the form of a read only memory (ROM), storing a program for controlling the data processor 25 to process seismic data by a method of the invention. The apparatus further comprises non-volatile read/write memory 27 for storing, for example, any data which must be retained in the absence of a power supply. A "working" or "scratch pad" memory for the data processor is provided by a random access memory RAM 28. An input device 29 is provided, for instance for receiving user commands and data. One or more output devices 30 are provided, for instance, for displaying information relating to the progress and result of the processing. The output device(s) may be, for example, a printer, a visual display unit, or an output memory.

Data for processing may be supplied via the input device 29 or may optionally be provided by a machine-readable data store 31.

The results of the processing may be output via the output device 30 or may be stored.

The program for operating the system and for performing the method described hereinbefore is stored in the program memory 26, which may be embodied as a semiconductor memory, for instance of the well known ROM type. However, the program may well be stored in any other suitable storage medium, such as a magnetic data carrier 26a (such as a "floppy disk") or a CD-ROM 26b.

What is claimed is:

1. A method of processing data comprising the step of: determining, from a first data sequence acquired by sampling a signal having associated uncertainty at a first sensor and from a second data sequence acquired by sampling substantially the same signal having associated uncertainty at a second sensor spatially separated from the first sensor, a sequence indicative of a measure of spread of the first and second data sequences, thereby to provide an estimate of the initial uncertainty in the signal.

2. The method of claim 1, further comprising the step of determining a data sequence indicative of the common signal within the first and second data sequences.

3. The method of claim 2, wherein the step of determining the common signal data sequence comprises determining, for each value in the first data sequence, a value indicative of the commonality of a value in the first data sequence and a corresponding value in the second data sequence.

4. The method of claim 1, wherein the step of determining the sequence indicative of the measure of the spread comprises determining, for each value in the first data sequence, a measure of the spread of a value in the first data sequence and the corresponding value in the second data sequence.

5. The method of claim 1, wherein the sequence indicative of the measure of spread is normalised relative to the absolute value of the common signal data sequence.

6. The method of claim 5, wherein the step of determining the sequence indicative of the measure of the spread comprises determining, for each value in the first data sequence, a measure of the spread of a value in the first data sequence and the corresponding value in the second data sequence, divided by the absolute value of the corresponding value in the common signal data sequence.

7. The method of claim 1, further comprising the steps of:
a) selecting two or more data sequences from a plurality of data sequences, each sequence having been obtained by sampling the signal at a respective sensor spatially separated from the other sensors; and
b) determining a sequence indicative of a measure of spread of the selected data sequences.

8. The method of claim 7, further comprising the step of:
c) determining a data sequence indicative of the common signal within the selected data sequences from the selected data sequences.

9. The method of claim 8, wherein the step of determining the common signal data sequence comprises determining, for each value in a first of the selected data sequences, a value indicative of the commonality of a value in the first data sequence and a corresponding value in the or each other selected data sequence.

10. The method of claim 7, wherein the step of determining the sequence indicative of the measure of the spread comprises determining, for each value in a first of the selected data sequences, a measure of the spread of a value in the first data sequence and a corresponding value in the or each other selected data sequence.

11. The method of claim 6, wherein the sequence indicative of the measure of spread is normalised relative to the absolute value of the common signal data sequence.

12. The method of claim 11, wherein the step of determining the measure of the spread comprises determining, for each value in a first of the selected data sequences, a measure of the spread of a value in the first data sequence and a corresponding value in the or each other selected data sequence, normalised by the absolute value of the corresponding values in the common signal sequence.

13. The method of claim 8, wherein step (a) comprises grouping the data sequences into two or more ensembles and selecting one of the ensembles of data sequences.

14. The method of claim 13, and comprising the further steps of selecting another one of the ensembles of data sequences, and repeating step (b) for the another selected ensemble of data sequences.

15. The method of claim 1, comprising the further step of outputting the sequence indicative of the measure of the spread.

16. The method of claim 2, and comprising the further step of outputting the common signal data sequence.

17. The method of claim 15, wherein the common signal data sequence and/or the sequence indicative of the measure of spread are output as respective traces.

18. The method of claim 1, wherein the measure of spread comprises the standard deviation of corresponding values in each data sequence.

19. The method of claim 1, wherein the measure of spread comprises the variance of corresponding values in each data sequence.

20. The method of claim 1, further comprising the further step of processing the common signal data sequence.

21. The method of claim 20, comprising the further step of controlling the step of processing the common signal data sequence on the basis of the measure of spread.

22. The method of claim 1, comprising the further step of pre-processing the data sequences before carrying out the step of determining the sequence indicative of the measure of spread.

23. The method of claim 22, and comprising the further step of controlling one or more parameters of the pre-processing step on the basis of the determined measure of spread, and repeating the pre-processing step.

24. The method of claim 31, wherein the pre-processing step is carried out before the selecting step.

25. The method of claim 1, wherein each data sequence is a seismic data sequence.

26. The method of claim 1, further comprising the step of acquiring each data sequence.

27. The method of claim 25, further comprising the step of acquiring each seismic data sequence using single sensor seismic data acquisition.

28. An apparatus for processing data, the apparatus comprising:
means for determining, from a first data sequence acquired by sampling a signal having associated uncertainty at a first sensor and from a second data sequence acquired by sampling substantially the same signal having associated uncertainty at a second sensor spatially separated from the first sensor, a sequence indicative of a measure of spread of the first and second data sequences, thereby to provide an estimate of the initial uncertainty in the signal.

29. The apparatus of claim 28, further comprising a programmable data processor.

30. A storage medium containing a program for the data processor of an apparatus as defined in claim 29.

31. The method of claim 7, further comprising the step of pre-processing the data sequences before carrying out the step of determining the sequence indicative of the measure of spread.

* * * * *